United States Patent
Lu et al.

(10) Patent No.: US 8,609,285 B2
(45) Date of Patent: Dec. 17, 2013

(54) CATHODE MATERIAL FOR A BATTERY WITH IMPROVED CYCLE PERFORMANCE AT A HIGH CURRENT DENSITY

(75) Inventors: Li Lu, Singapore (SG); Man On Lai, Singapore (SG); Hailong Wang, Singapore (SG); Hui Xia, Singapore (SG)

(73) Assignee: National University of Singapore, Singapore (SG)

( * ) Notice: Subject to any disclaimer, the term of this patent is extended or adjusted under 35 U.S.C. 154(b) by 55 days.

(21) Appl. No.: 13/130,857

(22) PCT Filed: Nov. 23, 2009

(86) PCT No.: PCT/SG2009/000441
§ 371 (c)(1),
(2), (4) Date: May 31, 2011

(87) PCT Pub. No.: WO2010/059134
PCT Pub. Date: May 27, 2010

(65) Prior Publication Data
US 2011/0229763 A1 Sep. 22, 2011

Related U.S. Application Data

(60) Provisional application No. 61/200,057, filed on Nov. 24, 2008.

(51) Int. Cl.
*H01M 4/13* (2010.01)

(52) U.S. Cl.
USPC .................. 429/231.95; 429/231.9; 429/223; 429/224

(58) Field of Classification Search
USPC .......................... 429/231.9, 231.95, 223, 224
See application file for complete search history.

(56) References Cited

U.S. PATENT DOCUMENTS

| 4,761,487 A * | 8/1988 | Godshall ........................ 429/112 |
| 6,248,477 B1 | 6/2001 | Howard, Jr. et al. |
| 2003/0082453 A1* | 5/2003 | Numata et al. ............ 429/231.95 |
| 2008/0118833 A1* | 5/2008 | Ueda et al. .................... 429/209 |

FOREIGN PATENT DOCUMENTS

| WO | WO 2006/050022 A2 | 5/2006 |
| WO | WO 2006/050100 A2 | 5/2006 |

OTHER PUBLICATIONS

International Search Report dated Jan. 27, 2010, issued in corresponding international application No. PCT/SG2009/000441.

* cited by examiner

*Primary Examiner* — Patrick Ryan
*Assistant Examiner* — Ben Lewis
(74) *Attorney, Agent, or Firm* — Ostrolenk Faber LLP

(57) ABSTRACT

A material for use in the cathode terminal of a battery that is made from a lithiated manganese oxide which is doped with ruthenium and optionally with a transition material and a method for the synthesis of the same. The material exhibits improved conductivity and cyclic performance at high current density (current density of 1470 mA/g and higher) and can be used in hybrid vehicles and other electronic devices due to its good cyclic performance at high current density and its relatively large capacity.

17 Claims, 9 Drawing Sheets

CATHODE MATERIAL FOR A BATTERY WITH IMPROVED CYCLE PERFORMANCE AT A HIGH CURRENT DENSITY

CROSS REFERENCE TO RELATED APPLICATIONS

The present application is a 35 U.S.C. §371 National Phase conversion of PCT/SG2009/000441, filed Nov. 23, 2009, which claims benefit of U.S. Provisional Application No. 61/200,057, filed Nov. 24, 2008, the disclosure of which is incorporated herein by reference. The PCT International Application was published in the English language.

FIELD OF INVENTION

The present application relates to cathode materials for a battery and more specifically to ruthenium (Ru) doped, lithiated manganese oxide materials with a spinel crystal structure used in the cathode terminal of lithium-ion and lithium rechargeable batteries to greatly enhance the cyclic performance of the cathode material at a high work voltage and a high current density.

BACKGROUND OF THE INVENTION

High lithium containing batteries are extensively used in modern life as electrochemical power sources.

There are two types of lithium batteries, namely primary lithium battery, and secondary battery. Lithium-ion secondary battery has been widely used in mobile phones, laptops and other modern appliances.

The cathode of a typical rechargeable lithium-ion battery uses a transition metal oxide material that can reversibly intercalate/deintercalate lithium at a high potential difference when carbon, for example, is used as the anode material. The first commercial lithium-ion batteries introduced in 1990 by Sony Corporation used $LiCoO_2$ as the cathode material, which continues to be used in more than 90% of lithium-ion batteries. $LiCoO_2$ has a well-ordered layered crystal structure, which is easily prepared and enables a fast and reversible lithium intercalation. However, $LiCoO_2$ has poor thermal stability and is toxic, rendering it unsuitable for large-sized battery applications, such as electric and hybrid vehicles, that require batteries to be stable, economical and environmentally friendly, along with good performance.

To replace layer-structured $LiCoO_2$, other cathode materials have been developed for many years. These other cathode materials can be divided into cathode materials having a spinel crystal structure and cathode materials having an olivine crystal structure. A typical cathode material with an olivine crystal structure, for example, $LiFePO_4$, has high theoretical capacity of about 170 mAh/g, low cost and non toxicity. However, the electronic conductivity of this type of cathode materials is poor, limiting its use in high charge/discharge rate applications, for example, in hybrid vehicles. Many methods have been researched to improve the conductivity of olivine lithium-based cathode materials. For example, $LiFePO_4$ particles have been coated with a thin carbon layer or doped with some metal cations, and nano-sized cathode particles have been synthesized. These methods have improved the electric conductivity.

Manganese oxides having a spinel crystal structure offer lower cost and lower toxicity compared to cobalt, and have been demonstrated to be safer when overcharged. The most readily prepared lithiated manganese oxide with a spinel crystal structure is $LiMn_2O_4$. $LiMn_2O_4$ includes three-dimensional channels, which allow for lithium diffusion. Lithiated manganese oxide has a high work voltage (around 4.2V), but a lower capacity than that of $LiCoO_2$, and low stability due to J-T distortion during lithium intercalation/de-intercalation. To improve its performance, $LiMn_2O_4$ has been doped with transition metals such as Cr, Ni and Cu among which $LiNi_{0.5}Mn_{1.5}O_4$ shows a higher work voltage (around 4.5~4.7V), a large capacity (around 147 mAh/g) and a relatively good cycle performance below a relative high current density of around 147 mA/g. Many efforts have been made to further optimize the electrochemical performance of lithiated nickel manganese oxide at high current density by the synthesizing nano-sized particles of lithiated nickel manganese oxide to make lithium diffusion easier and by doping lithiated nickel manganese oxide with metal cations to improve its structural stability and enhance its conductivity. However, these improvements have not been that effective in rendering the structural stability and conductivity of $LiNi_{0.5}Mn_{1.5}O_4$ suitable for hybrid vehicles.

SUMMARY OF THE INVENTION $LiNi_{0.5}Mn_{1.5}O_4$ is a promising cathode material for applications requiring high work voltage especially for hybrid vehicles. However, the cycle performance of $LiNi_{0.5}Mn_{1.5}O_4$ at high current density is poor due to its structure instability and limited conductivity. The present invention in one aspect advantageously provides a method of improving the cycle performance of $LiNi_{0.5}Mn_{1.5}O_4$ at high current density with Ru doping.

An object of the present invention is to develop a novel cathode material for use in a battery. One example of a novel material according to the present invention is to develop ruthenium (Ru) doped $LiNi_{0.5}Mn_{1.5}O_4$ cathode material with a spinel structure. Ru is a metal with a large oxidation state extending from +2 to +8. Another object of the present invention is to produce Ru doped $LiNi_{0.5}Mn_{1.5}O_4$ cathode material powders that exhibit good electrochemical properties at high current density.

A battery according to the present invention includes a first terminal and a second terminal, in which the first terminal is made from a lithiated manganese oxide doped with ruthenium, the lithiated manganese oxide including lithium and manganese and having a spinel crystal structure. In its preferred form, the ruthenium doped lithiated manganese oxide further comprises a transition metal, which may be selected from a group consisting of Cr, Ni, Cu. The ruthenium may reside in one of positions for the transition metal within the crystal structure, positions for lithium within the crystal structure, and positions of the transition metal and positions for the lithium within the crystal structure. Ruthenium as used in the present invention can have a valence of $2^+$ to $8^+$.

In one embodiment, nickel is the transition metal, and ruthenium resides in the nickel positions in the crystal structure with a formula $Li[Li_{(C-2)x}Ru_xNi_{0.5-(C-1)x}]Mn_{1.5}O_4$ in which x is a number in the range 0.0001 to 0.5/(C−1), C being the valence of the ruthenium. Thus, for ruthenium of valence $4^+$, x can be in the range of 0.0001 to 0.1666.

In another embodiment, nickel is the transition metal, and ruthenium resides in the lithium positions within the crystal structure with a formula $Li_{1-Cx}Ru_xNi_{0.5}Mn_{1.5}O_4$ in which x is a number in the range 0.0001 to 0.5/C, C being the valence of ruthenium. Thus, for ruthenium of valence $4^+$, x can be in the range of 0.0001 to 0.125.

In yet another embodiment, nickel is the transition metal and ruthenium resides in the nickel positions within the crystal structure with a formula $LiRu_xNi_{0.5-(Cx/2)}Mn_{1.5}O_4$ in which x is a number in the range 0.0001 to 1/C, C being the valence of ruthenium. Thus, for ruthenium of valence $4^+$, x can be in the range of 0.0001 to 0.25.

A process for the synthesis of a material according to the present invention includes mixing of a lithium compound, a transition metal compound, a manganese compound, and a ruthenium compound to obtain a mixture; calcining the mixture; and firing the calcined mixture. The lithium compound can be selected from a group consisting of $Li_2CO_3$, $Li_2O$, and LiOH, the transition metal compound can be selected from a group consisting of $N_xO$, $NiCO_3$, and $Ni(OH)_2$, the manganese compound is selected from a group consisting of $MnO_2$, and $Mn(OH)_4$, and the ruthenium compound is $RuO_2$. The amount of each compound is selected so that the ruthenium doped lithiated manganese oxide is charge neutral. The calcining can be carried out at a calcination temperature in the range 200-700° C. for a period of time in the range 1 to 50 hours. The firing can be carried out at a firing temperature in the range 600-1400° C. for a period of time in the range 1 to 50 hours. Preferably, the calcining and the firing are carried out with intermittent grinding of the mixture.

Other features and advantages of the present invention will become apparent from the following description of the invention which refers to the accompanying drawings.

DETAILED DESCRIPTION

Figure 1A:
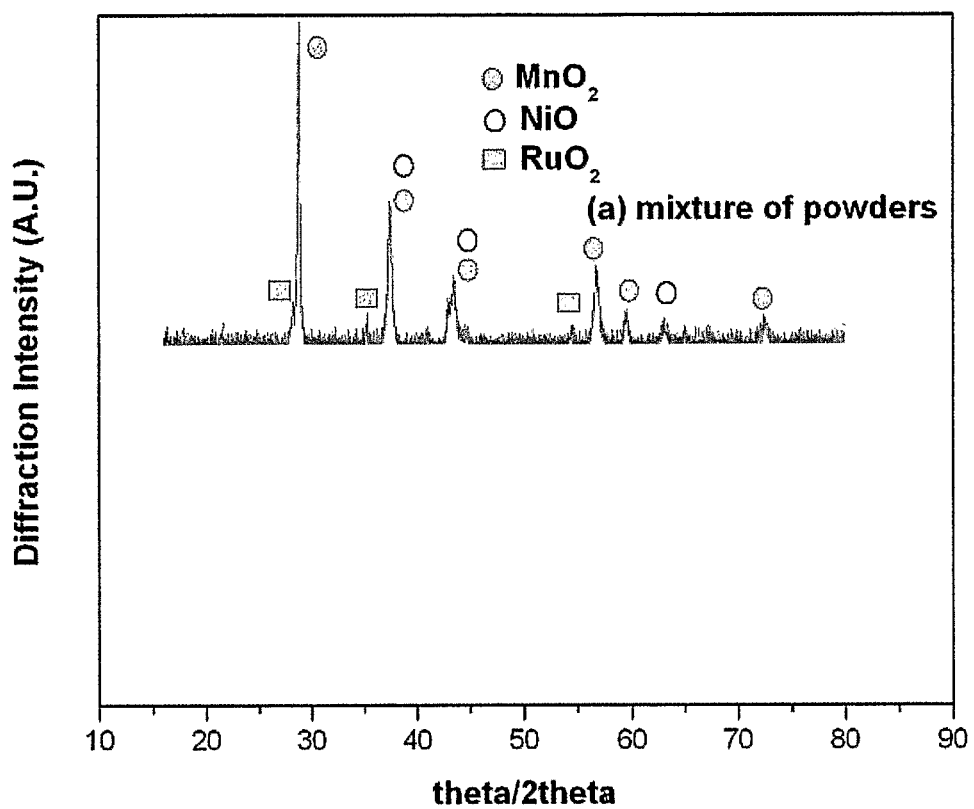
FIG. 1A shows the x-ray diffraction (XRD) spectra of Ru doped $LiNi_{0.5}Mn_{1.5}O_4$ powder system before the calcining and the firing process.

A typical battery includes a first terminal (e.g. a cathode terminal) and second terminal (e.g. an anode terminal). According to the present invention, the first cathode terminal of a battery is made from lithiated manganese oxide ($LiMn_2O_4$) having a spinel crystal structure which has been doped with ruthenium. The lithiated manganese oxide according to the present invention is preferably doped with a transition metal such as chromium (Cr), nickel (Ni), or copper (Cu) in which the ruthenium atoms reside in positions that would be occupied by lithium atoms within the crystal structure (i.e. partly replacing lithium atoms), in the positions that would be occupied by the transition metal within the crystal structure (i.e. partly replacing the transition metals), or in positions that would be occupied by lithium atoms and positions that would be occupied by a transition metal (i.e. partly replacing lithium atoms and partly replacing transition metals). Thus, in one exemplary embodiment, nickel is used as a transition metal and ruthenium can occupy lithium positions within the crystal structure, or nickel positions within the crystal structure of the lithiated manganese oxide, or both. Ruthenium as used in the present invention can have a valence of $2^+$ to $8^+$.

$Li[Li_{(C-2)x}Ru_xNi_{0.5-(C-1)x}]Mn_{1.5}O_4$ (Formula 1) is a formula for one material system according to the present invention, in which x is a number in the range 0.0001 to 0.5/(C−1), C being the valence of the ruthenium. It should be noted that in this material system the ruthenium content should be selected so that the total ion content after doping should result in charge neutrality. Thus, for ruthenium of valence $4^+$, x can be in the range of 0.0001 to 0.1666 and the formula can be rewritten as $Li_{1+2x}Ru_xNi_{0.5-3x}Mn_{1.5}O_4$. Note that in a material system according to formula 1, nickel atoms are partly replaced by ruthenium and partly by lithium atoms.

$LiRu_xNi_{0.5-(Cx/2)}Mn_{1.5}O_4$ (Formula 2) is another formula for a material system in which ruthenium replaces nickel atoms in the crystal structure. In formula 2, x is a number in the range 0.0001 to 1/C, C being the valence of ruthenium. Thus, for ruthenium of valence $4^+$, x can be in the range of 0.0001 to 0.25. In this example, ruthenium partly replaces nickel ions in the material system.

$Li_{1-Cx}Ru_xNi_{0.5}Mn_{1.5}O_4$ (Formula 3) is a formula for a material system in which ruthenium partly replaces lithium in the crystal structure. In formula 3, x is a number in the range 0.0001 to 0.5/C, C being the valence of ruthenium. Thus, for ruthenium of valence $4^+$, x can be in the range of 0.0001 to 0.125.

Note that in each example recited above the content of either nickel or lithium is varied according to the ruthenium content. However, the manganese oxide content does not vary. Thus, each formula can be rewritten as $(A)Mn_{1.5}O_4$ in which A is one of $Li_{1+(C-2)x}Ru_xNi_{0.5-(C-1)x}$, $LiRu_xNi_{0.5-(Cx/2)}$ and $Li_{1-Cx}Ru_xNi_{0.5}$. It should be noted that while the examples disclosed are based on a spinel crystal structure having a general formula $LiNi_{0.5}Mn_{1.5}O_4$, in some cases $O_4$ could be $O_{(4-a)}$, where a is larger than and Mn and Ni may not have $4^+$ and $2^+$ valences. Thus, the compound may include $Mn_{(1.5-b)}$ and $Ni_{(0.5-c)}$, where b and c are numbers larger than . One skilled in the art would understand that in the event Mn and/or Ni content changes, the formula representing the chemical composition of the compound must change accordingly, and may not necessarily correspond to the formulas disclosed herein as examples.

A method for the synthesis of a material according to the present invention includes mixing of a lithium compound, a nickel compound, a manganese compound, and a ruthenium compound to obtain a mixture; calcining the mixture; and firing the calcined mixture. The calcining and the firing can be intermittently interrupted and the mixture is subjected to grinding. The lithium compound can be selected from a group consisting of $Li_2CO_3$, $Li_2O$, and LiOH, the nickel compound can be selected from a group consisting of $N_xO$, $NiCO_3$, and $Ni(OH)_2$ or other Ni containing compounds, the manganese compound is selected from a group consisting of $MnO_2$, and Mn(OH)$_4$ or other Mn containing compounds, and the ruthenium compound is RuO$_2$ or other Ru containing compounds. The calcining can be carried out at a calcination temperature in the range 200-700° C. for a period of time in the range 1 to 50 hours. In one preferred embodiment, the mixture is calcined for 2 hours. The firing can be carried out at a firing temperature in the range 600-1400° C. for a period of time in the range 1 to 50 hours. These parameters should provide sufficient heat energy and time for precursor materials to crystallize and grow to form well crystallized cathode material Note that ruthenium content should be selected so that even with doping the material will be charge neutral.

Note that the compounds for the mixture are preferably metal oxides but can be other compounds. Furthermore, the mixing can be carried out by ball milling, co-precipitation, sol-gel or the Pechini process wherein the mixing is conducted for a period of time sufficient to form a homogeneously distributed powder. Thus, for example, the metal oxide precursors/compounds can be initially mixed together with an oxide of ruthenium cations. To achieve some degree of homogeneity, the mixture is preferably ball milled for about 1 to 3 hours, or, alternatively, dissolved in an appropriate solvent under constant stirring for 1 to 24 hours. All precursors are preferably ball milled for at least 1 hour or dissolved in solution under constant stirring for at least 1 hour to achieve at least some degree of homogeneity.

Besides varying the composition of the precursors/compounds, the properties and the quality of the powders may be altered by altering the processing parameters, such as calcination temperature, sintering temperature and dwell time. These parameters are advantageously controlled in order to achieve optimal performance.

EXAMPLES

The following examples illustrate embodiments of the invention only and should not be construed as limiting on the invention in any way.

Example 1

Ru Doped in Ni Positions—Formula 1 and Formula 2 Systems

Figure 1B:
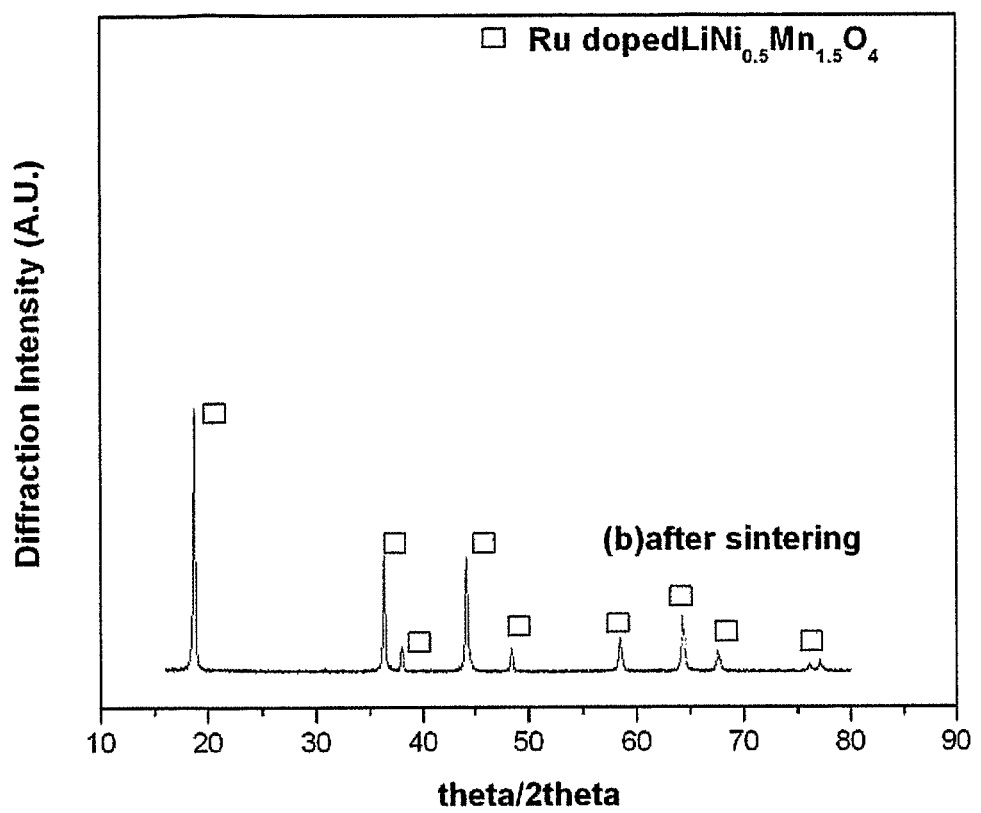
FIG. 1B shows the x-ray diffraction (XRD) spectra of Ru doped $LiNi_{0.5}Mn_{1.5}O_4$ powder system after the calcining and the firing process.
Figure 2A:
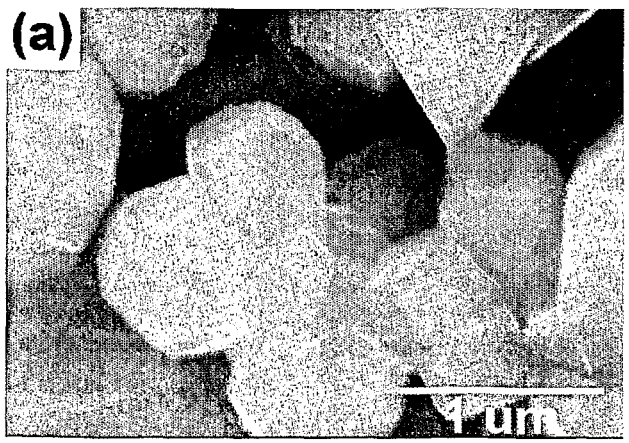
FIGS. 2A-2C show scanning electron microscopy (SEM) results for $LiNi_{0.5}Mn_{1.5}O_4$ (FIG. 2A), $Li_{1.1}Ni_{0.35}Ru_{0.05}Mn_{1.5}O_4$ (FIG. 2B) and $LiNi_{0.4}Ru_{0.05}Mn_{1.5}O_4$ (FIG. 2C).
Figure 2B:
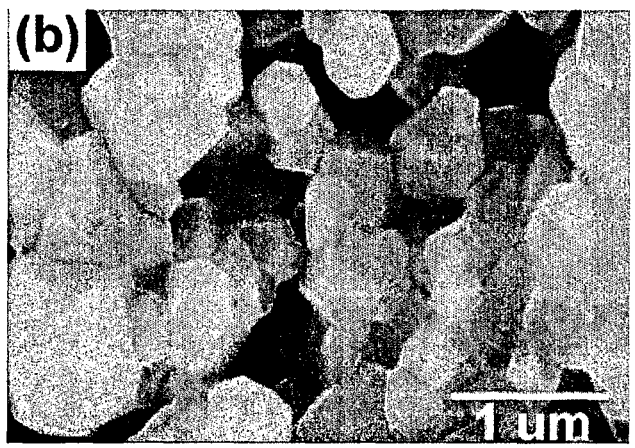
Figure 2C:
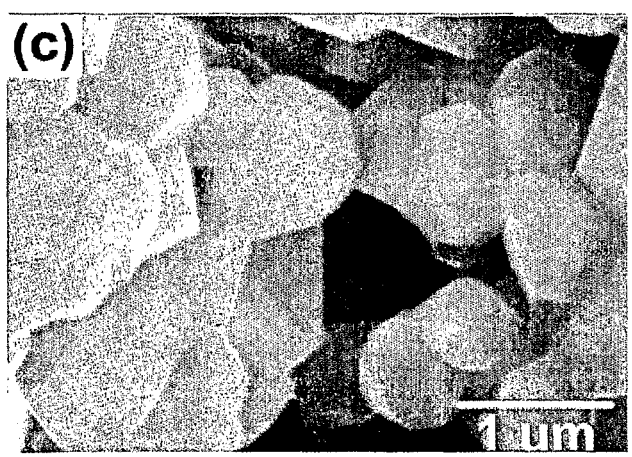
Figure 3:
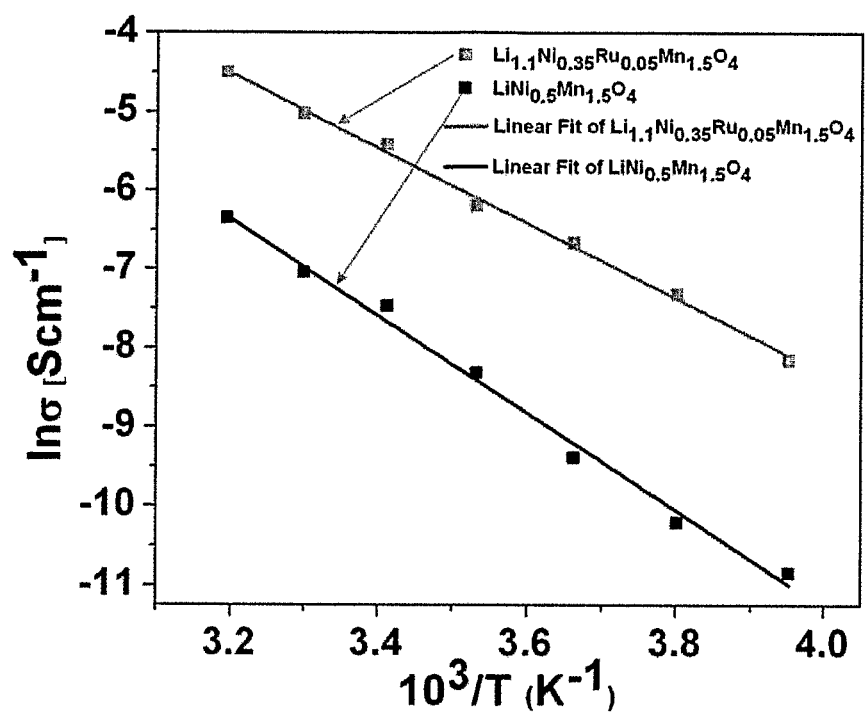
FIG. 3 shows data relating to the electrical conductivities of $LiNi_{0.5}Mn_{1.5}O_4$ and $Li_{1.1}Ni_{0.35}Ru_{0.05}Mn_{1.5}O_4$ measured at different temperatures.
Figure 4:
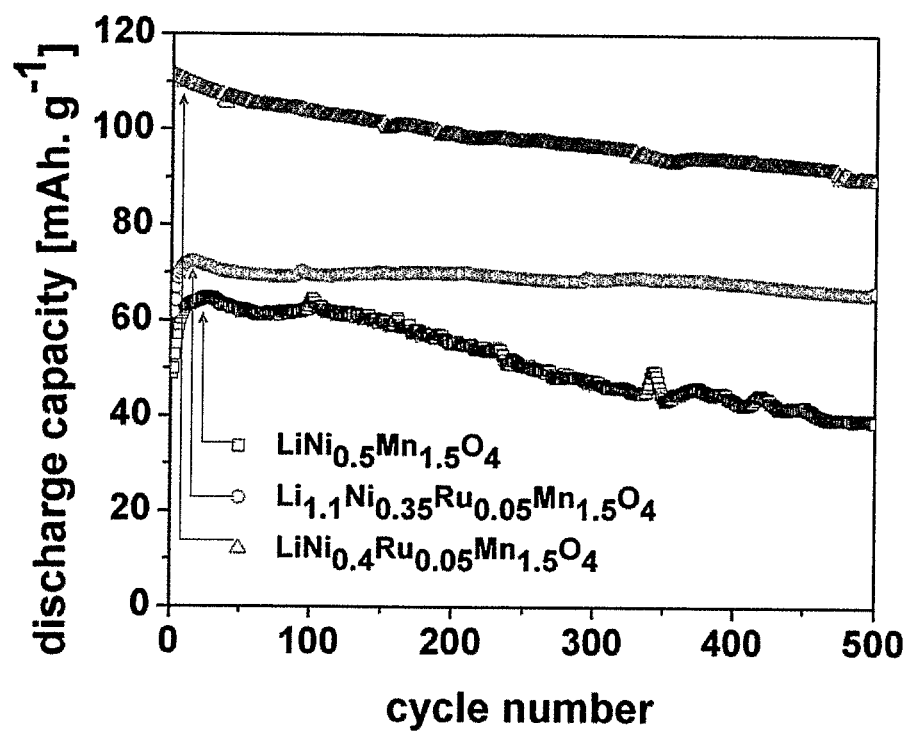
FIG. 4 shows data relating to the capacity retention of $LiNi_{0.5}Mn_{1.5}O_4$, $Li_{1.1}Ni_{0.35}Ru_{0.05}Mn_{1.5}O_4$ and $LiNi_{0.4}Ru_{0.05}Mn_{1.5}O_4$ charged/discharged at high current density 1470 mA/g.
Figure 5:
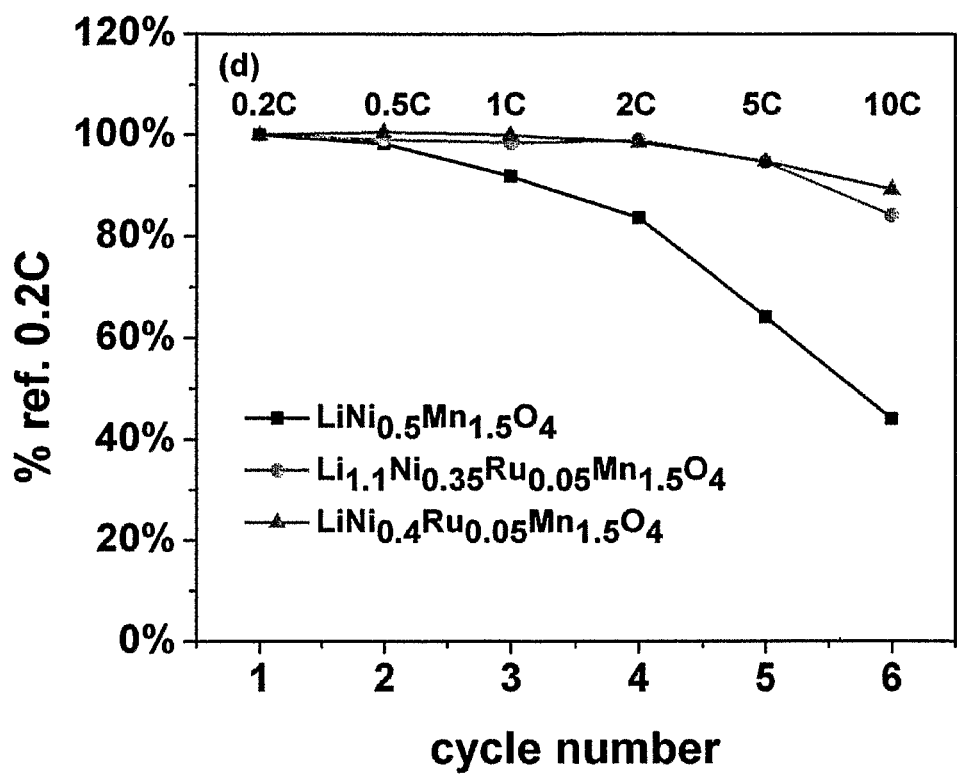
FIG. 5 shows data relating to the rate capacity of $LiNi_{0.5}Mn_{1.5}O_4$, $Li_{1.1}Ni_{0.35}Ru_{0.05}Mn_{1.5}O_4$ and $LiNi_{0.4}Ru_{0.05}Mn_{1.5}O_4$ charged at 29.4 mA/g (0.2 C) and discharged at different current densities.
Figure 6A:
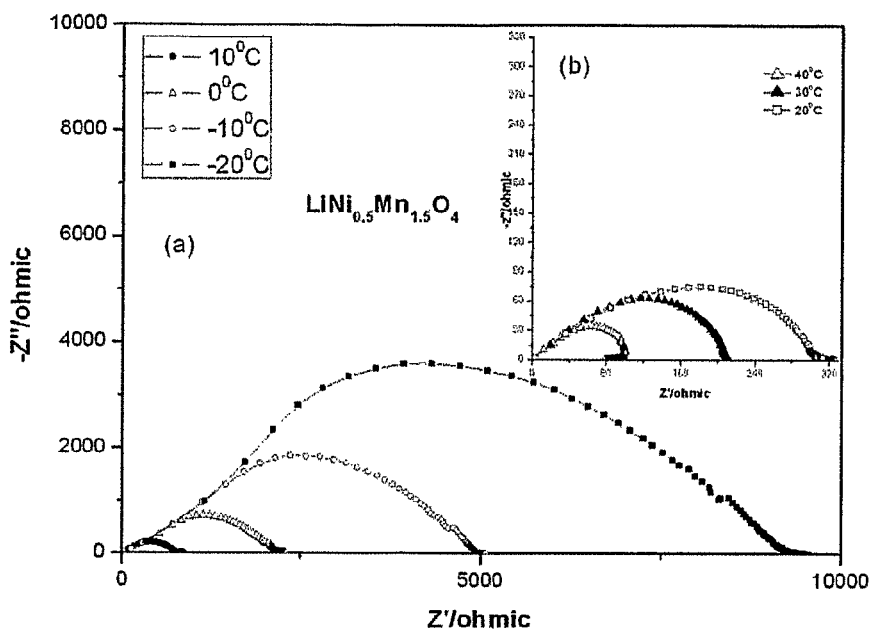
FIGS. 6A-6B show a comparison of Nyquist plots from −20° C. to 40° C. of $LiNi_{0.5}Mn_{1.5}O_4$ (FIG. 6A) and $Li_{1.1}Ni_{0.35}Ru_{0.05}Mn_{1.5}O_4$ (FIG. 6B) pellets sintered at 800° C. for 15 hours and 1000° C. for 2 hours.
Figure 6B:
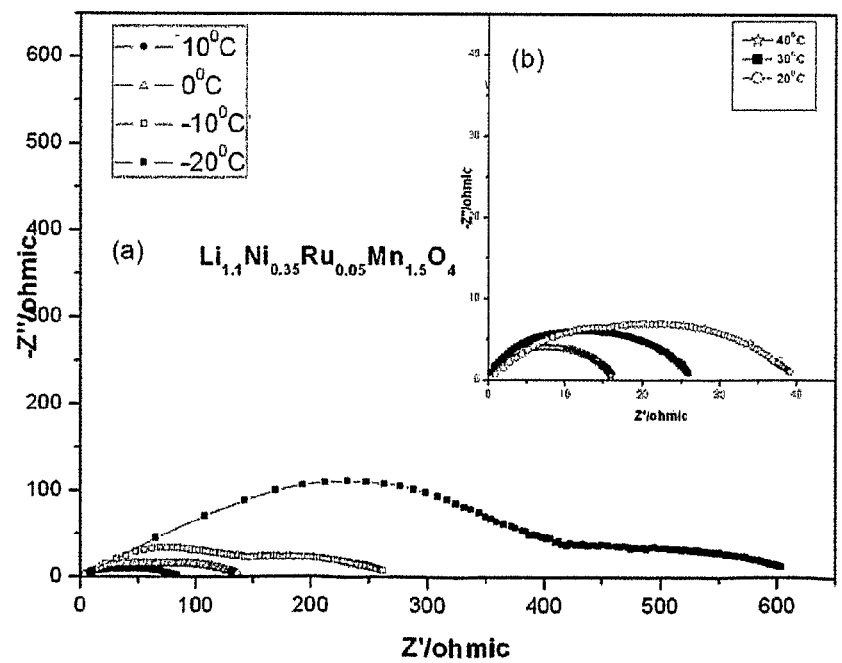
Figure 7:
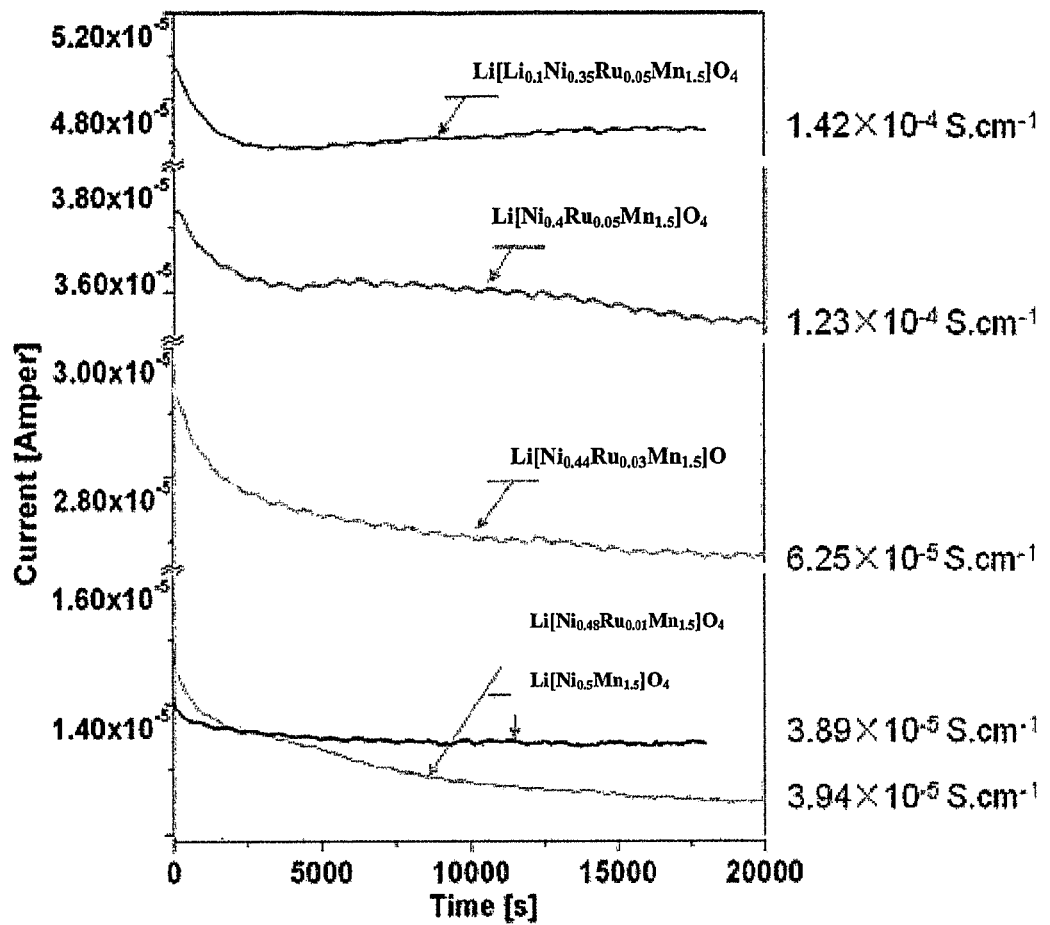
FIG. 7 discloses data relating to the electric conductivity measurements showing that the electronic conductivity increases with increase in Ru concentration.

In this example, C is 4+, whereby the formula can be rewritten in terms of ruthenium content as $Li_{1+2x}Ru_xNi_{0.5-3x}Mn_{1.5}O_4$ (Formula 1) and $LiRu_xNi_{0.5-2x}Mn_{1.5}O_4$ (Formula 2). For the $Li_{1+2x}Ru_xNi_{0.5-3x}Mn_{1.5}O_4$ system (Formula 1) and $LiRu_xNi_{0.5-2x}Mn_{1.5}O_4$ system (Formula 2), the content of Ru was 0.05 (x=0.05). Stoichiometric amounts of LiOH, NiO, MnO$_2$ and RuO$_2$ were mixed according to corresponding Formula 1 and Formula 2, respectively. The mixtures were first ball milled for 120 min to form powder mixtures. After ball milling, calcinations were carried out at 650° C. for 3,000 minutes. Formation of $Li_{1+2x}Ru_xNi_{0.5-3x}Mn_{1.5}O_4$ was observed. FIGS. 1A and 1B show the X-ray diffraction (XRD) spectra of the $Li_{1+2x}Ru_xNi_{0.5-3x}Mn_{1.5}O_4$ powder system before and after solid state reaction. FIG. 1A shows the ball milled powder mixture XRD spectrum where NiO, MnO$_2$ and RuO$_2$ diffraction peaks can be seen. After solid state reaction, pure NiO, MnO$_2$ and RuO$_2$ diffraction peaks disappeared and a new spinel type of $Li_{1+2x}Ru_xNi_{0.5-3x}Mn_{1.5}O_4$ phase was detected. Microstructures of $LiNi_{0.5}Mn_{1.5}O_4$, $Li_{1+2x}Ru_xNi_{0.5-3x}Mn_{1.5}O_4$ and $LiRu_xNi_{0.5-2x}Mn_{1.5}O_4$ are shown in FIGS. 2A, 2B and 2C. As can be seen in FIGS. 2A-2C, $Li_{1+2x}Ru_xNi_{0.5-3x}Mn_{1.5}O_4$ achieves a relatively smaller particle size with the same synthesis condition. Conductivities of $LiNi_{0.5}Mn_{1.5}O_4$ and $Li_{1+2x}Ru_xNi_{0.5-3x}Mn_{1.5}O_4$ are shown in FIG. 3. It can be seen that at room temperature the electrical conductivity of $Li_{1+2x}Ru_xNi_{0.5-3x}Mn_{1.5}O_4$ is nearly 8 times of that of $LiNi_{0.5}Mn_{1.5}O_4$, and in the whole range of tested temperatures the electrical conductivity of $Li_{1+2x}Ru_xNi_{0.5-3x}Mn_{1.5}O_4$ is always several times higher than that of $LiNi_{0.5}Mn_{1.5}O_4$. The cycle performances of these three cathode materials at 1470 mA/g are shown in FIG. 4. The $Li_{1+2x}Ru_xNi_{0.5-3x}Mn_{1.5}O_4$ reaches a maximum capacity of about 70 mAh/g after several cycles and the capacity remains almost constant without change after 500 cycles; whereas, the $LiNi_{0.5}Mn_{1.5}O_4$ system reaches its maximum capacity of about 65 mAh/g, and drastically reduces to 40 mAh/g after 500 cycles. It is shown that $LiRu_xNi_{0.5-2x}Mn_{1.5}O_4$ can deliver the highest capacity of 111 mAh/g. The rate capacity of these three material systems is plotted in FIG. 5 where the three systems were cycled at the same charging rate but different discharge rates. Although the capacities for all systems are the same when the charging rate is below 0.5 C, the rate capacity of the $LiNi_{0.5}Mn_{1.5}O_4$ is dramatically reduced at high charge rates. It has been shown that the Ru doped $Li_{1+2x}Ru_xNi_{0.5-3x}Mn_{1.5}O_4$ possesses low resistance compared to the undoped $LiNi_{0.5}Mn_{1.5}O_4$ (FIG. 6). FIG. 7 shows electric conductivity measurements using DC polarization. The measurement reveals that the electric conductivity increases with increase in Ru concentration.

Example 2

Ru doped in Li Position—Formula 3 System

Figure 8:
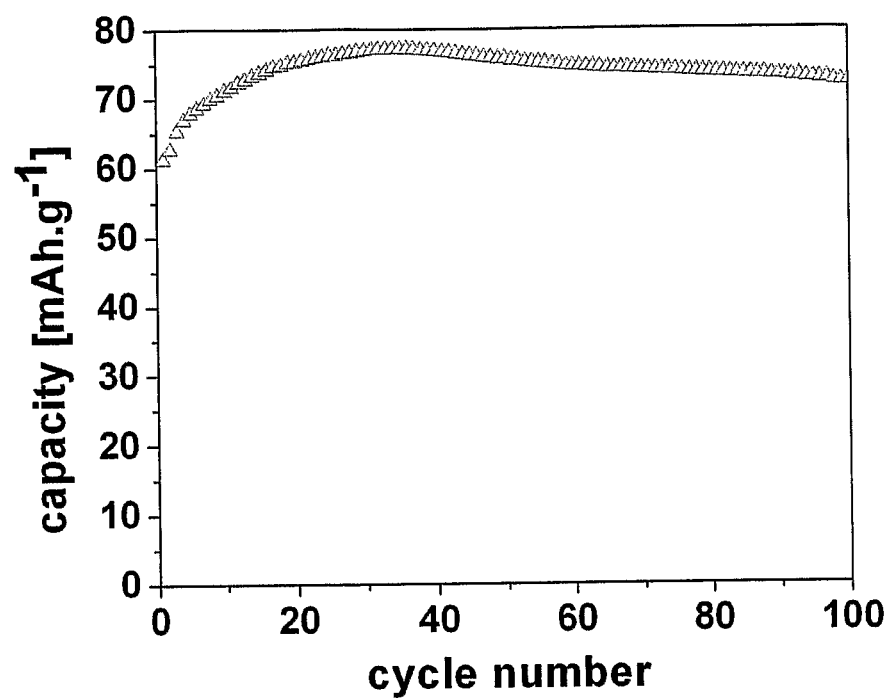
FIG. 8 shows data relating to the capacity retention of $Li_{0.88}Ru_{0.03}Ni_{0.5}Mn_{1.5}O_4$. charged/discharged at high current density 1470 mA/g.

In this example, ruthenium is doped in lithium ion sites leading to the formation of some lithium ion vacancies. Stoichiometric amounts of LiOH, NiO, MnO$_2$ and RuO$_2$ were mixed according to corresponding Formula 3. The mixture was first ball milled for 120 min to form a powder mixture. After ball milling, calcination was carried out at 650° C. for 3,000 minutes. Due to partial replacement of lithium ions by ruthenium ions, the capacity is slightly reduced at low charge and discharge rates. However, at the high charge and discharge rate of 10 C (1470 mA/g), its capacity is higher than that of $LiNi_{0.5}Mn_{1.5}O_4$ (FIG. 8). In addition, there is almost no capacity fade at a 10 C rate.

While the foregoing examples relate to lithiated nickel manganese oxide based material systems, one skilled in the art would recognize that the principles of the invention may also be applied to other cathode material systems in which ruthenium doping may be applied.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A battery comprising: a first terminal and a second terminal, said first terminal comprising lithiated manganese oxide doped with ruthenium, said lithiated manganese oxide including lithium, a transition metal, and manganese oxide, having a spinel crystal structure, and including a first part and a second part, the first part and the second part being in a one to one ratio, the first part including manganese oxide, and the second part including lithium, the transition metal, and ruthenium, wherein the content of at least one of lithium and the transition metal are based on the content of ruthenium and ruthenium's valence.

2. A battery according to claim 1, wherein said ruthenium resides in one of positions for said transition metal, positions for lithium within said crystal structure, and positions of said transition metal and positions for said lithium.

3. A battery according to claim 2, wherein said transition metal is selected from a group consisting of Cr, Ni, and Cu.

4. A battery according to claim 2, wherein said transition metal is Ni, and ruthenium resides in Ni positions within said crystal structure in which x represents the ruthenium content and is a number in the range 0.0001 to 1/C, C being the valence of ruthenium.

5. A battery according to claim 2, wherein said transition metal is Ni, and ruthenium resides in lithium positions within said crystal structure in which x represents the ruthenium content and is a number in the range 0.0001 to 0.5/C, C being the valence of ruthenium.

6. A battery according to claim 2, wherein said transition metal is Ni, and ruthenium resides in both Ni and Li positions within said crystal structure in which x represents the ruthenium content and is a number in the range 0.0001 to 1.5/C, C being the valence of ruthenium.

7. A battery according to claim 2, wherein said transition metal is Ni, and ruthenium partly replaces Ni atoms.

8. A battery according to claim 1, wherein said transition metal is Ni, and ruthenium partly replaces lithium atoms.

9. A battery according to claim 1, wherein said transition metal is Ni, and ruthenium partly replaces lithium atoms and partly replaces nickel atoms.

10. A process for synthesis of a ruthenium doped lithiated manganese oxide material having a spinel crystal structure comprising: synthesizing a ruthenium doped lithiated manganese oxide having a spinel structure that includes lithium, a transition metal, and manganese oxide, the doped lithiated manganese oxide including a first part and a second part, the first part and the second part being in a one to one ratio, the first part including manganese oxide, and the second part including lithium, the transition metal, and ruthenium, wherein the content of at least one of lithium and the transition metal are based on the content of ruthenium and ruthenium's valence, and wherein the synthesizing includes mixing of a lithium compound, a transition metal compound, a manganese compound, and a ruthenium compound to obtain a mixture; calcining said mixture; and firing said calcined mixture.

11. A process according to claim 10, wherein said lithium compound is selected from a group consisting of $Li_2CO_3$, $Li_2O$, LiOH, and a compound that includes lithium and at least another element.

12. A process according to claim 10, wherein said transition metal compound is selected from a group consisting of NiO, $NiCO_3$, $Ni(OH)_2$, and a compound that includes nickel and at least another element.

13. A process according to claim 10, wherein said manganese compound is selected from a group consisting of $MnO_2$, $Mn(OH)_4$, and a compound that includes manganese and at least another element.

14. A process according to claim 10, wherein said ruthenium compound is $RuO_2$, or a compound that includes ruthenium and at least another element.

15. A process according to claim 10, wherein said calcining and said firing are carried out with intermittent grinding of said mixture.

16. A process according to claim 10, wherein said calcining is carried out at a temperature in the range 200-700° C. for a period of time in the range 1 to 50 hours.

17. A process according to claim 10, wherein said firing is carried out at a temperature in the range 600-1400° C. for a period of time in the range 1 to 50 hours.

\* \* \* \* \*

UNITED STATES PATENT AND TRADEMARK OFFICE
CERTIFICATE OF CORRECTION

PATENT NO. : 8,609,285 B2  Page 1 of 1
APPLICATION NO. : 13/130857
DATED : December 17, 2013
INVENTOR(S) : Lu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 62 days.

Signed and Sealed this
Twenty-second Day of September, 2015

Michelle K. Lee
*Director of the United States Patent and Trademark Office*